Dec. 6, 1938.  H. K. FAIRALL  2,138,846
COLOR MOTION PICTURE PRODUCING APPARATUS
Filed July 29, 1932  3 Sheets-Sheet 1
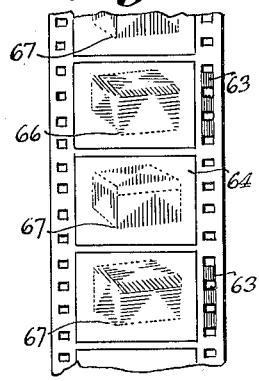
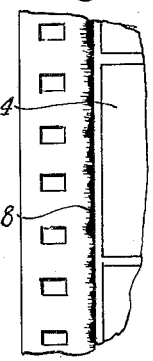
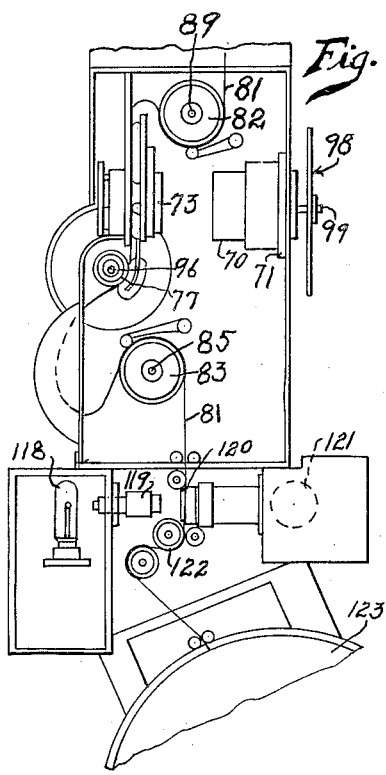
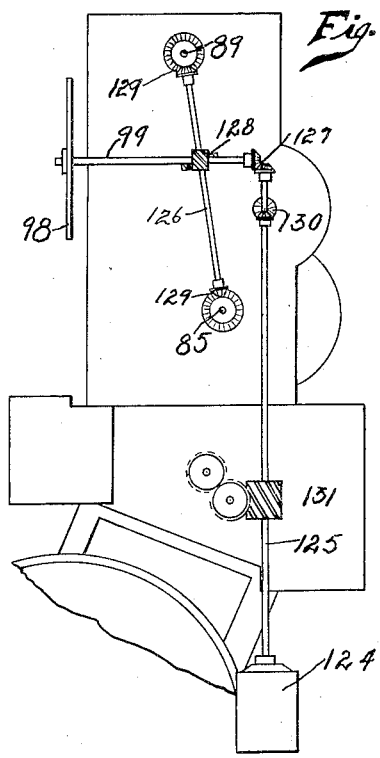
INVENTOR.
Harry K. Fairall
BY
Larrabee
his ATTORNEY.

Dec. 6, 1938.  H. K. FAIRALL  2,138,846
COLOR MOTION PICTURE PRODUCING APPARATUS
Filed July 29, 1932   3 Sheets-Sheet 2
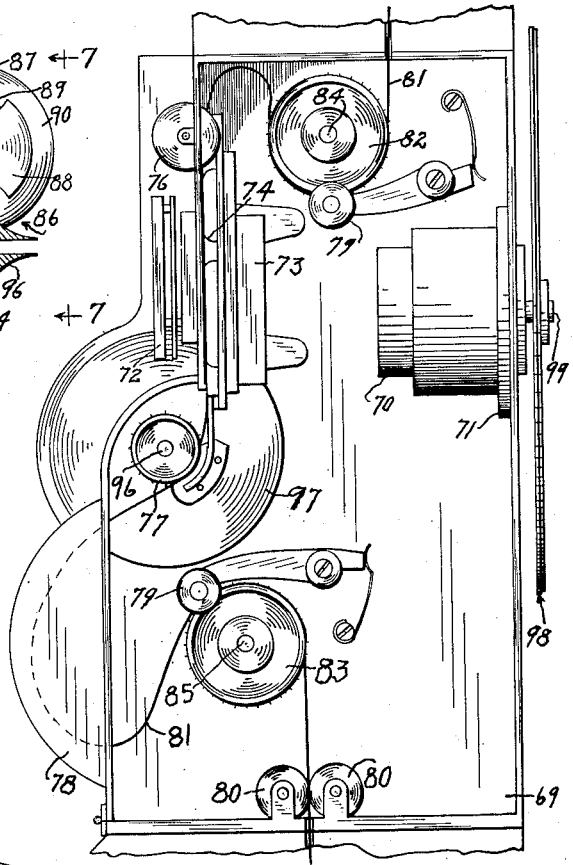
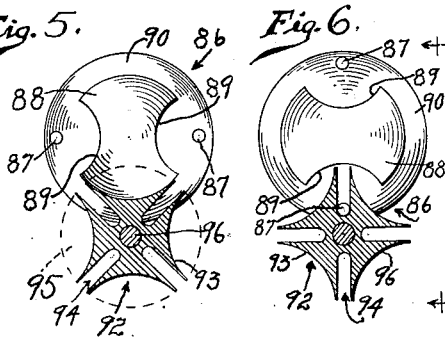
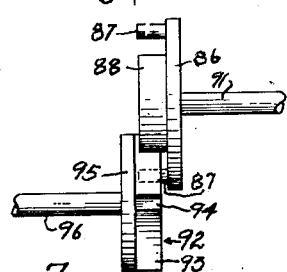
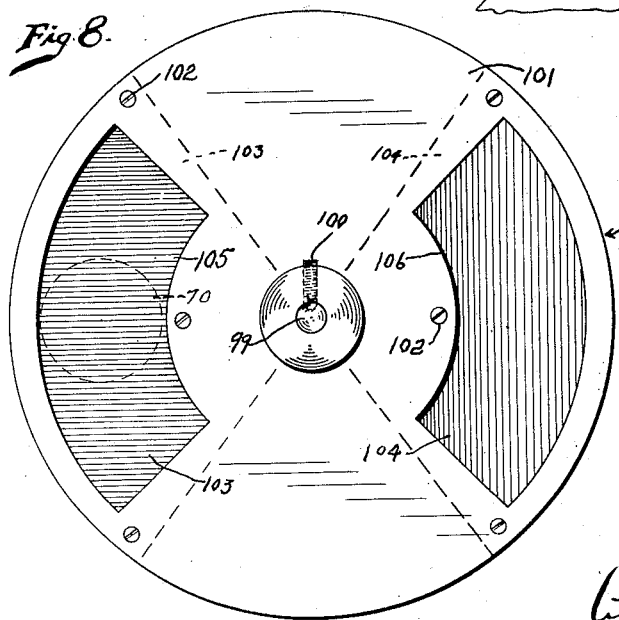
INVENTOR
Harry K. Fairall
BY
his ATTORNEY.

Dec. 6, 1938.    H. K. FAIRALL    2,138,846
COLOR MOTION PICTURE PRODUCING APPARATUS
Filed July 29, 1932    3 Sheets-Sheet 3
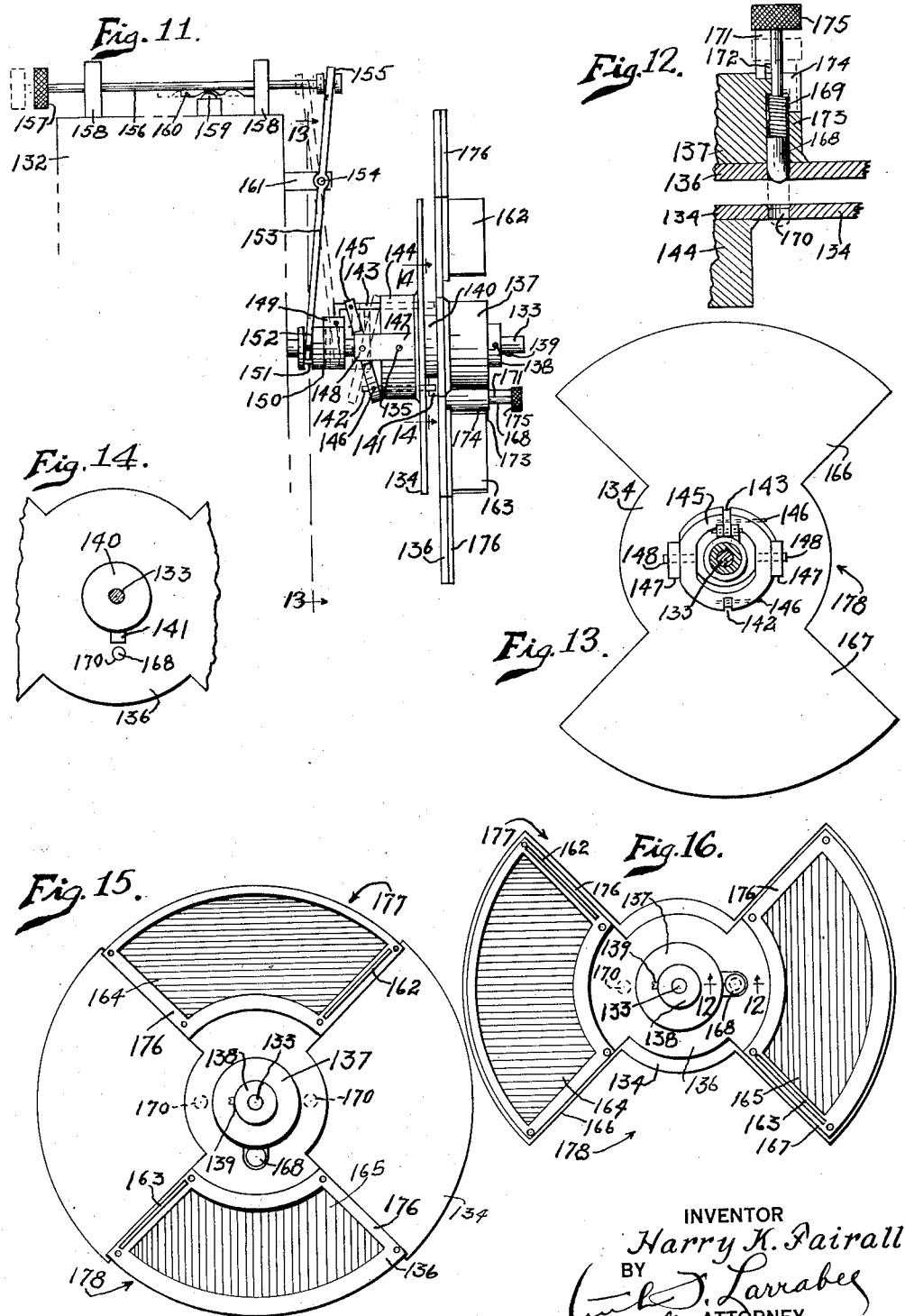
INVENTOR
Harry K. Fairall.
BY
his ATTORNEY.

Patented Dec. 6, 1938

2,138,846

UNITED STATES PATENT OFFICE 2,138,846

COLOR MOTION PICTURE PRODUCING APPARATUS

Harry K. Fairall, Hollywood, Calif., assignor to Fairall Color Corporation, a corporation of California Application July 29, 1932, Serial No. 625,945

3 Claims. (Cl. 88—16.4)

This invention pertains to the production of colored motion pictures by the process of color separation and color control through speed control of the film.

An object of this invention is the novel production of colored motion pictures wherein a negative comprising alternate color separated images which when projected at a normal rate of speed of the projector but with a double speed of the intermittent movement will produce a colored motion picture.

An object of this invention is to provide a novel projector for projecting a color separated negative by means of a combined shutter and color screen and which includes two color screens or filters, i. e., a blue-green color screen and an orange-red color screen, whereby the shutter and associated color screens are operated between the lens and the film, thus providing means for operating a color screen with a fixed relation to the film, whereby any combination of lenses, or lenses of varying focal length or adjustment may be used with the same shutter and combined color screens.

An object is to provide a novel projector for projecting a color separated negative wherein the shutter is provided with two openings having color screens extending across such openings, and wherein an intermittent movement having a speed whereby two frames of the film are moved past the aperture during one revolution of the shutter.

An object is to provide a novel projector for projecting colored motion pictures wherein the speed of the film sprockets and the intermittent movement is increased two times the normal speed to provide for running the film at the same speed at which the negative was run in the camera during the photographing operation, and in which the shutter is run at normal speed, and the conventional drive elements of the projector are also run at normal speed.

An object is to provide a novel projector for the purpose of projecting colored motion pictures wherein the shutter includes two color screens or filters, i. e., a blue-green color screen and an orange-red color screen, whereby the shutter and associated color screens may be operated between the light and the film, between the film and the lens, or between the lens and the screen, thereby imposing the colors alternately on the light projected through the film in the same order relative to the color separated images thereon as the color screen shutter was operated in the camera relative to the negative during a photographing process.

An object is to provide a novel projector for the purpose of projecting colored motion pictures and which is adapted to pass the film therethrough at twice the normal speed and which comprises an intermittent movement for that purpose having a double cam adapted to engage and operate a conventional star wheel twice during its normal revolution, thereby operating the intermittent sprocket at twice the speed of the conventional drive mechanism of the projector without increasing power.

An object is to provide a novel projector adapting the normal drive mechanism thereof, operating the drive mechanism at the normal speed, to operate so as to pass film therethrough at twice the normal speed, and to that end I have provided upper and lower sprocket wheels having twice the number of teeth and circumference, thereby when rotated at the normal speed the circumferential speed will be doubled.

An object is to provide a sound track having double the length of recording area, thereby providing ample space to properly photograph the sound record of all notes and particularly those of high frequency, each note being photographed separately and distinctly and thereby eliminating the present overlap whereby many sounds are not distinctly recorded, and therefore cannot be accurately reproduced.

An object is to provide a novel method of producing colored motion pictures having a minimum speed operation point, wherein are recorded and projected color separated images, each color separated image series being alternately projected with the other color separated image series, each series being photographed and projected with the same color of screen, each series being individually projected at a speed equivalent to the normal speed of black and white film, the aggregation of the two series providing a projection of twice the footage of film normally run resulting in the projected picture being composed of a combined series of alternately colored images of great smoothness, and in photographed movement smoothness of action and absence of color bombardment hitherto unknown.

An object is to provide a novel method of producing colored motion pictures wherein the elapsed time between photographing and projecting is equivalent to the time normally consumed for developing and printing black and white film, thereby eliminating the excessive delay normally occurring in the production of colored pictures.

An object is to provide a novel method whereby colored motion pictures may be projected through any projection machine having the film feed mechanism adjusted and a color screen shutter incorporated, and which colored motion pictures may be produced with less cost than other methods; although my method uses more footage of raw stock it is far more economical than the high costs of the processing required in other methods and the enormous saving of time is an additional economy feature especially in studio and news work.

An object is to provide a novel mechanism whereby a color filter shutter may be adjusted while the projector is in operation for the purpose of synchronizing the color screen with the color separated image on the film being run.

An object is to provide a novel shutter mechanism adapted to be used in the projection of both colored and black and white film, combining means to lock the color filter shutter in position to show black and white film, and means to release film projection and to be adjustably operated to synchronize the color filters with the film.

My invention includes the parts and combinations of parts, as well as the novel method, all hereinafter more specifically described and claimed in the specification and claims appended hereto.

Other objects, advantages, and features of invention may appear from the accompanying drawings, the subjoined detail description and the appended claims.

The accompanying drawings illustrate my invention in some of the forms I at present deem preferable.

Fig. 1 is a diagrammatic view of a section of film, indicating by means of an image the color separation of the film to be projected.

Fig. 2 is an enlarged section of the film including a photographic variable area sound record.

Fig. 3 is a diagrammatic view of a projected color picture with the image formed from the color separated images disclosed in Fig. 1.

Fig. 4 is a side elevation of a projector head with the side door removed, disclosing in side elevation the film feed, intermittent movement and shutter.

Fig. 5 is an end elevation partly in section of the star and cam intermittent movement, showing the star in locked position.

Fig. 6 is a view similar to Fig. 5 showing the cam engaging the star for rotating the same, and taken on a plane indicated by line 9—9, Fig. 7.

Fig. 7 is a side elevation of the star and cam in engaged position as shown in Fig. 6 and as viewed from line 10—10, Fig. 6, looking in the direction of the arrows.

Fig. 8 is a front elevation of the projector shutter.

Fig. 9 is a more or less diagrammatic view of a combined projector and sound reproducing device.

Fig. 10 is a more or less diagrammatic view of the drive mechanism for the mechanism disclosed in Fig. 9.

Fig. 11 is a side elevation of the shutter control device in one position, a second position being indicated by broken lines, and a fragment of a projector head indicated as the supporting means.

Fig. 13 is a view of the permanent shutter as scale of the locking pin for the shutter, taken on line 17—17, Fig. 16.

Fig. 13 is a view of the permanent shutter as viewed from a plane indicated by line 18—18, in Fig. 11 showing the rocking ring and the connection of the engaging fingers, the control member and the shaft being sectioned, and the shutter having been rotated one-quarter turn, and the color screens eliminated for purpose of clearness.

Fig. 14 is a fragmental view of the adjustable color screen shutter taken on line 19—19, Fig. 11, disclosing the stop and the locking pin.

Fig. 15 is a front elevational view of the shutters as viewed from the right looking to the left in Fig. 11, and showing the color screen shutter in operative position.

Fig. 16 is a view analogous to Fig. 15 disclosing the color screen shutter moved to non-operative position.

Heretofore in the art, it has been customary to photograph and project black and white silent pictures at a speed of 16 frames, or one foot of film, per second. The speed of operation of the film was limited by the sensitiveness of the emulsion on the film to light.

Color photography was limited to the so-called subtractive methods, and color separation methods were found impractical owing to the slowness of the film and also color bombardment.

With the introduction of sound into motion picture production, it was found necessary to speed up the film to permit the recording of a sound record, and film containing sound records are now practically universally photographed and projected at a speed of 24 frames, or one and one-half feet, per second. This brought about improvements in the manufacture of film with a faster emulsion, and film obtainable on the market today has a speed several times the original film, also high color sensitiveness.

My invention and method comprises running film through a camera for exposure purposes at a speed approximately twice that of the present normal speed of 24 exposures per second, or at a speed of approximately 48 or more exposures per second and in alternately exposing each frame through color filters of different characters and which are associated with the usual shutter for the camera and arranging and adapting the camera to make two exposures during one revolution of the shutter.

I have found that film now obtainable on the market is satisfactory for such increased speed of exposures per second.

Therefore I obtain a negative film the frames of which have color separated images thereon, and which can be developed the same as ordinary black and white film, then printed and developed the same as black and white film and on the same raw stock as used for black and white film without requiring any special positive film, developing, processing or coloring.

My invention and method also comprises projecting such prints through a projecting machine at a speed of approximately 48 or more frames per second, and in projecting the images on each frame through a complementary color filter that is preferably associated with the shutter of the projecting machine.

By this method of obtaining and projecting color pictures I obtain a color picture of remarkable clarity, steadiness, fidelity of color value, and entire elimination of color bombardment.

By exhaustive tests made upon the reduction of my invention to practice, I have found that the above results are obtained at speeds approximately at, or above, 48 exposures per second. In the photographing of movement it becomes necessary to obtain a succession of exposures which are photographed rapidly enough one following another that blur is practically eliminated, as blurred images mean color blur or color bombardment. I have entirely eliminated this by my method which requires that the rate of exposures be approximately at, or above, 48 exposures per second.

My invention and method also comprises providing a sound track which is double the length for the photographic records, and in passing such sound track through a conventional sound reproducing device, associated with a projection machine through which my film is projected, at the same speed that it travels through the projector, that is to say at approximately 48 or more frames per second. I thereby provide double the space for the recording of each note, eliminating any overlap which is now present and prevents accurate recording, especially of notes of high intensity or high frequency. My method gives sufficient and ample room for recording each sound modulation and complete definiteness in the recording of each note, which is impossible on film run at the normal speed of 24 frames per second.

I have thus provided a method of producing color and sound pictures having great clearness, fidelity of color, sharpness, absence of color bombardment, and a quality and range of sound reproduction, obtainable by operating the film at a speed approximately at, or above, 48 exposures per second.

Fig. 1 discloses more or less diagrammatically a representation of color separated images on a section of film 64. The image 66 represents the negative of any image photographed through the blue-green screen, wherein the orange-red rays have been filtered and the blue-green rays permitted to pass and act on the film emulsion.

Inversely the same result is obtained in the image 67 in which the image was photographed through the orange-red color screen, wherein the blue-green rays have been filterd out and the orange-red rays permitted to pass to the negative.

The film 64 is produced by any suitable camera (not shown) and which is provided for marking each alternate plane of the film by alternate exposure surfaces 63 to facilitate the assembling of the film in correct rotation of the color separated image.

Fig. 3 represents more or less diagrammatically the completed image picture as viewed on the projection screen, where the colors blue-green and orange-red have again been introduced into the image by passing the projected light through the color screens following the rotation of alternation of screens versus images as when the picture was photographed, the negative having been reversed in printing, and the shaded parts become transparent to permit the passage of light to the screen.

Fig. 2 represents more or less diagrammatically an enlarged portion of a film disclosing a photographic record of sound by the method known as variable area recording. The sound record 68 as recorded by my method wherein the speed of the film is doubled, permits the serrations double width in recording and the consequent absence of overlap. The same method and result also applies to variable density recording, where normally at 6,000 cycles there are about 330 striations per inch of sound track; whereas, by my method, through doubling the speed of the film, there would be recorded about 160 striations per inch of sound track.

Fig. 4 discloses the projection head of a projector. I have shown here only such parts as have direct bearing on my invention, but it is to be understood that in referring to a projector to be used in this method of picture production, that a complete projector together with its necessary and conventional equipment, mechanism and lamp house is to be part of this description without detailed showing and description. This includes sound reproduction device, lights, and necessary synchronized power drive.

The reverse side of the projector head is not shown, as conventional drive mechanism and conventional gearing is utilized, such changes as are required to convert a projector to adapt it to project film at a minimum speed of approximately 48 exposures per second being fully shown and described.

The projector head comprises a frame or case 69 to which are secured the various parts and members. The lens 70 is conventionally mounted in mounting 71 in frame 69. The light shield 72 is conventional as are the film gate 73, the pressure springs 74, the roller 76, the sprocket wheel 77, loop guard 78, tension rollers 79 and guide rollers 80.

The changes required to increase the speed of travel of the film 81 include replacing the upper and lower sprocket wheels (not shown) which are normally sprocket wheels having 16 teeth, with larger sprocket wheels 82 and 83 having 32 teeth each, and mounting them on the conventional drive shafts 84 and 85 as shown.

To increase the speed of the intermittent movement I have provided a new star and cam to replace the conventional star and cam movement. These comprise the cam 86, which is provided with two pins 87 in place of the one pin conventionally used, and having a solid cam 88 provided with opposed dwells 89 provided for the passage of the points of the star. The cam 86 is provided with a circular flange support 90 supporting the pins 87, and a shaft 91 connecting to the driving mechanism of the head (not shown).

The star 92 is of conventional pattern, with dwells 93 adapted to be engaged by the cam 98, and slots 94 adapted to be engaged by the pins 87, and I have provided a reinforcing flange 95 of circular form shown in Fig. 7, and indicated in broken lines in Fig. 5; the shaft 96 extends to receive the recited sprocket 77. The star 92 and cam 86 are housed in the space normally provided for them supported by the frame 69 and back of the housing 97.

Thus the cam 86 rotates at normal speed, and by means of the two pins 87 drives the star 92 at double the speed, consequently the sprocket 77 is driven at twice the normal speed. This results in the drive mechanism (not shown) of the head, together with the shutter 98 traveling at normal speed, as do the sprocket wheel shafts 84 and 85, the star 92 and its connected sprocket 77 rotate at twice the speed, while the increased diameter of the sprocket wheels 82 and 83 give the increased peripheral speed required, thus moving the film through the head at twice normal speed.

The shutter 98 is mounted on shutter drive shaft 99 and is secured thereto by set screw 100; a shutter shield 101 is secured to the shutter 98 by screws 102; this shield 101 is provided for the purpose of securely holding the color screens 103 and 104, which are indicated by broken lines in Fig. 8, and disclosed through openings 105 and 106 provided for the passage of light through the shutter; the colors of the screens are indicated by horizontal shading representing blue-green for the screen 103, and vertical shading representing orange-red for the screen 104.

For the purpose of injecting color into the projected light images in the rotation in which they were photographed through corresponding color screens in the camera, the film is supplied with the recited border markings 63, which if they were photographed through the blue-green screen in the camera would be threaded up in the projector to appear opposite the aperture when the blue-green screen in the projector shutter was in front of the lens, thus the proper color screens would be in synchronism with the corresponding color separated images.

Figs. 9 and 10 illustrate the relation of the speed of the film with the drive mechanism.

Fig. 9 discloses a diagrammatic view of a projector such as is disclosed in Fig. 4, and wherein like parts bear like numbers, and also showing incorporated therewith a sound head for the reproduction of sound from the sound track of the film.

The film 81 travels downwardly through the projector at the speed of 180 feet per minute and is passed into the sound head which comprises an exciting lamp 118, lens tube 119, aperture plate 120, photoelectric cell 121, film sprocket 122, and take-up magazine 123.

Fig. 10 discloses a diagrammatic view of the opposite side of the mechanism disclosed in Fig. 9, disclosing the means to drive the several parts, comprising the motor 124, drive shaft 125, secondary shaft 126 and a shutter drive shaft 99.

Assuming that a motor is used with a speed of 1440 R. P. M. the shutter 98, being geared one to one to the drive shaft 125 by means of the gearing 127 will rotate at a speed of 1440 R. P. M. The secondary shaft 126 is driven by the drive shaft 125 through gears 128, and the shafts 85 and 89 upon which are mounted sprocket wheels 82 and 83 being required to travel at a speed of 360 R. P. M. which is approximately one-quarter that of the drive shaft and is obtained by means of the reduction gears 129.

The intermittent movement of shiftable means for the film being required to operate 2880 times per minute, the speed of the cam shaft 91 is 1440 R. P. M. and is therefore driven from the drive shaft 125 by a one to one gearing 130.

The sprocket wheel 122 in the sound head having to operate at double its normal speed or 720 R. P. M. has a gearing 131 interposed between it and the drive shaft 125 to obtain that speed.

Thus it will be seen that by my method and the substitution of a few gears and sprocket wheels, a conventional projector and sound head may be readily and easily adapted to project color pictures and reproduce sound by my method.

The color screen synchronizing device shown in Fig. 16 comprises the indicated projector head 132 and the conventional shutter drive shaft 133 which supports the shutters.

There is provided the permanent shutter 134 which is secured to the shaft 133 by means such as the set screw 135 and rotates therewith.

There is also provided a color screen shutter 136 rotatably mounted on the shaft 133 and having a hub 137 providing a bearing and support.

The shutter 136 is positioned on the shaft 133 by the collar 138 provided with a set screw 139, and is provided on the reverse side, as best shown in Figs. 16 and 19, with a spacer 140 secured thereto; the spacer 140 bears the stop 141 which will be alternately engaged by one or the other of the fingers 142 and 143 when operated for that purpose.

The fingers 142 and 143 are supported by the hub 144 part of the permanent shutter 134, and therefore rotate with the shaft 133, and are further connected to a rocking ring 145 by means of pins 146; the ring 145 is supported by the members 147 which form extensions from the hub 144, the ring 145 rocks therein on the supporting pins 148 which connect it to the members 147.

The finger 143 extends to connect by means of the pin 149 with the operating member 150 which is slidably supported on the shaft 133; the operating member 150 has an annular recessed portion 151 in which rides the bifurcated end 152 of the lever 153 which is pivoted at 154 and is connected by means of the opposite bifurcated end 155 with a control rod 156 having a button 157 provided for manual operation.

The control rod 156 may be supported from the head 132 by such means as the supports 158; there is provided a spring pressed ball 159 adapted to contact the stop bar 160 for properly positioning the control rod 156 in its travel.

The lever 153 may be supported from the head 132 by such means as the support 161 and the recited pivot 154.

To provide means to slow down the rotation of the color screen shutter 136 when one finger is released and the other finger inserted in the path of the stop 141 for the purpose of causing the inserted finger to immediately contact the stop 141 and pick up the drive of shutter 136 I have provided the fans 162 and 163 secured to the front face of the shutter 136, which by means of the air resistance tends to form a drag upon the shutter and slow the speed upon a change of the fingers 142 and 143. The fans may be of any size suitable to the work.

To provide for securing the color screen shutter 136 in non-operative position where it would be rotated directly in front of permanent shutter 134 so that the color screens 164 and 165 would be in alinement with the leaves 166 and 167 of the permanent shutter 134, as shown in Fig. 16, and thus place the machine in condition to project black and white film, I have provided the manually operable spring pin 168, best shown in Figs. 11 and 12, carried by shutter 136.

The pin 168 is shown provided with a spring 169 adapted to press it in engagement with the shutter 134 in which is provided two openings 170 provided for the reception of the pin 168, and when the pin 168 is inserted in either of the openings 170 the shutters 134 and 136 are securely locked together.

There is further provided a stop 171 on the pin 168 to hold it out of engagement, and a dwell 172 in the mounting 173 to retain the stop 171 in position during normal operation of the machine; when the pin 168 is moved to engaged position the stop 171 passes into a slot 174 in the mounting 173 provided for the reception thereof. The pin 168 is provided with the head 175 for ease in manual operation.

For the purpose of supporting the color screens 163 and 164 in proper position on shutter 136 and to provide ease of removal thereof, I have provided frames 176 for that purpose which may be secured in position by any suitable means as shown. The fans 162 and 163 are secured thereto for convenience of construction.

The normal position of the shutters 134 and 136 during the projection of color pictures is as disclosed in Fig. 15 where the color screens 164 and 165 reside across the openings 177 and 178 which are formed by the leaves 166 and 167 of the permanent shutter as disclosed in Fig. 13, and when the shutter 136 is in non-operative position as shown in Fig. 16, the openings 177 and 178 are unobstructed to allow for the projection of black and white pictures.

In the operation of my method of producing color motion pictures, a camera is used that will run the film at twice the normal speed, and wherein the shutter makes one revolution to the passage of two frames of the film past the aperture.

Two two-color screens are provided in the camera shutter with two opposed openings of approximately 90 degrees, one screen being blue-green and the other being orange-red. The resultant negative will be a series of alternate images having the color separation produced by the different filters and will show color separation as indicated in Fig. 1.

After photographing the negative, the negative is then developed in the normal way and can be immediately printed on regular positive stock, and developed as usual. The negative used in this work is necessarily a stock having a high color sensitivity and may need developers adapted to that stock, but no processing is required, or other extra work which would involve extra labor or loss of time, therefore, the film can be worked as rapidly as ordinary black and white film.

Conventional sound equipment may readily be used in conjunction with this camera, the feed mechanism of which is driven at a speed which will pass the film therethrough at the same rate as it passes through the camera, thereby producing a sound record photographed on a sound track utilizing twice the normal length of track for the width of each note record, thus overcoming loss in reproduction due to overlapping particularly in notes of high frequency, and producing sound waves having great clearness and distinctness of definition.

To project the positive print of my film a projector is supplied wherein the shutter runs at normal speed but in which the velocity of the film is increased to double that of normal. Any suitable projection machine can be readily adapted to this work by my invention of replacing the upper and lower sprocket wheels with sprocket wheels of twice the size, and replacing the star and cam with a cam having two pins, as shown in Figs. 5-7.

A shutter on the projector having two openings provided with two two-color screens identical with those used in the camera is prepared, the film threaded up to synchronize the color separated images with the proper color screens, and a picture will be projected having absolute fidelity of color, with great clearness, and entire absence of color bombardment.

Sound reproducing devices of conventional form may be connected with the projector and the film run therethrough at a speed equivalent to its velocity through the projector and thereby reproduce sound from the recorded sound track, as described. A distinct advantage of sound recording by my method of color film is that the film is not colored and the sound record is not influenced by variations and shades of color, as would be the case were the sound record composed of a combination of colors.

My method of producing color pictures with sound requires a minimum speed of approximately 48 exposures per second, 3 feet of film per second or 180 feet of film per minute, and is only operable efficiently approximately at or above this speed.

To operate the color synchronizing device to change the shutter 136 relative to shutter 134, the button 157 is either pulled out or pushed in according to its initial position, the shifting of the button 157 moves the bar 156, rocks the lever 153 and slides the control member 150 to or from the shutters, this movement by means of the connected finger 143 rocks the ring 145 and thereby withdraws the particular finger that is inserted in the path of the stop 141 and inserts the opposite finger in the path of the stop.

The fans 162 and 163 form a sufficient drag on shutter 136 as to slow its speed sufficiently that the inserted finger immediately picks up the stop 141 and the drive of shutter 136 is interrupted only long enough for the inserted finger to come in contact with the stop 141.

The color shutter 136 has by this operation lost a half revolution, and reversed the order of the color screens.

Certain modifications may present themselves to one versed in the art, but such modifications may well be made without departure from the spirit of my invention as defined in the appended claims, the showing of this description and drawings being merely an illustration of one embodiment of my invention in response to the statutory requirement to applications for patent.

I claim:

1. Color motion picture producing apparatus comprising a projector, means in said projector for projecting moving pictures at a minimum speed of approximately 48 images per second, a shutter drive shaft, a permanent shutter secured to said shaft, a color screen shutter rotatably mounted on said shaft, means to drive said color screen shutter from said permanent shutter, means to form a drag on said color screen shutter, and manually operable means to change the drive relation between said shutters under the influence of said drag means while the projector is in operation.

2. Color motion picture producing apparatus comprising a projector, means in said projector to project moving pictures at a minimum speed of approximately 48 images per second, a shutter drive shaft on said projector, a permanent shutter secured to said shaft, a color screen shutter driven by said permanent shutter, means to change the driving relation of the said shutters, and means to lock the color screen shutter in alinement with the permanent shutter.

3. Color motion picture producing apparatus comprising a projector; a shutter drive shaft, a shutter rotatable by said shaft; a color screen shutter rotatably mounted on said shaft; drive means connecting said shutters to rotate the same in synchronism; and manually operable means to change the drive relation between said shutters; and air resistant means to form a drag on said color shutter when said drive relation between said shutters is disengaged during operation of said shutters.

HARRY K. FAIRALL.